(12) United States Patent
Junqua et al.

(10) Patent No.: US 6,415,257 B1
(45) Date of Patent: Jul. 2, 2002

(54) SYSTEM FOR IDENTIFYING AND ADAPTING A TV-USER PROFILE BY MEANS OF SPEECH TECHNOLOGY

(75) Inventors: Jean-Claude Junqua; Roland Kuhn; Tony Davis, all of Santa Barbara; Yi Zhao, Goleta, all of CA (US); Weiying Li, Montreal (CA)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/383,797

(22) Filed: Aug. 26, 1999

(51) Int. Cl.[7] .............................................. G10L 15/22
(52) U.S. Cl. ...................... 704/275; 704/257
(58) Field of Search ................................ 704/275, 270, 704/272, 251, 257, 255, 200, 274, 273, 256, 231

(56) References Cited

U.S. PATENT DOCUMENTS

| | | |
|---|---|---|
| 5,774,859 A | 6/1998 | Houser et al. |
| 5,832,439 A * | 11/1998 | Cox et al. .................... 704/274 |
| 5,897,616 A * | 4/1999 | Kamevsky et al. ......... 704/246 |

OTHER PUBLICATIONS

"Will ReplayTV make me more popular?, And Other Frequently Asked Quetions"; promotional material, www.replaytv.com/replaytv/faq.htm#q7; Aug. 24, 1999, pp. 1–3.

* cited by examiner

Primary Examiner—Richemond Dorvil
(74) Attorney, Agent, or Firm—Harness, Dickey & Pierce, P.L.C.

(57) ABSTRACT

Speech input supplied by the user is evaluated by the speaker verification/identification module, and based on the evaluation, parameters are retrieved from a user profile database. These parameters adapt the speech models of the speech recognizer and also supply the natural language parser with customized dialog grammars. The user's speech is then interpreted by the speech recognizer and natural language parser to determine the meaning of the user's spoken input in order to control the television tuner. The parser works in conjunction with a command module that mediates the dialog with the user, providing on-screen prompts or synthesized speech queries to elicit further input from the user when needed. The system integrates with an electronic program guide, so that the natural language parser is made aware of what programs are available when conducting the synthetic dialog with the user.

38 Claims, 6 Drawing Sheets

SYSTEM FOR IDENTIFYING AND ADAPTING A TV-USER PROFILE BY MEANS OF SPEECH TECHNOLOGY

BACKGROUND AND SUMMARY OF THE INVENTION

The present invention relates generally to interactive television. More particularly, the invention relates to a system and method for controlling interaction with the television using speech, whereby each user of the system may have a set of predefined preferences that are automatically selected through identification/verification of the speaker's voice.

Interactive television promises to provide a wealth of information content that boggles the mind. Current electronic program guide technology is ill-equipped to support the interactive modality. On-screen electronic program guides and push button remote control devices offer a far too complex and cumbersome user interface for selecting a program the user wishes to watch or record. It can take several minutes to scroll through or navigate through an on-screen program guide display; and pushbutton remote controls have expanded to include so many buttons that they are virtually useless, particularly in a darkened room.

Speech technology offers a way out of the current complexity dilemma. Speech can be a natural way to interact with a system, by narrowing the myriad of possible program selections to a more manageable number that can then be selected by further speech or through more conventional on-screen display and remote control pushbutton techniques.

While great strides have been made in speech technology, the truly natural, interactive environment for interactive television has yet to be achieved. A natural, intuitive interaction between user and consumer product such as the interactive TV, requires more than just good speech recognition. Natural interaction requires a sense of context, so that the semantics or underlying meaning of a user's spoken commands will be properly understood. Different people express themselves in different ways, thus these differences need to be taken into account for a good understanding of the user's spoken instructions.

The present invention addresses this concern through a unique system that ascertains the identity of the speaker when that speaker first addresses the system with an appropriate wakeup command. The command can be a polite word, such as "please," that is uttered when the user first wishes to use the system. A speaker verification/identification module within the system identifies the user's identity, based on his or her speech and then invokes a pre-defined or pre-stored set of user preferences. These preferences guide further interaction between the user and the system, making the system appear more natural to the user and simultaneously increasing the system's ability to understand the semantic content of the user's instructions.

The user preferences may store a diverse range of information, such as which channels the user is able to access (in this way adult channels can be blocked from children), customized dialogs that the system will use for that user, system usage log information, recording what that user has previously viewed, and a set of adapted speech models that will allow the recognizer of the system to do a better job in recognizing that user's utterances. The usage log may be used, for example, to learn the user's viewing preferences, thereby assisting the system in understanding the user's current request. The log may also be used to monitor a child's use of the television, thereby limiting the child's viewing to a pre-defined duration.

For a more complete understanding of the invention, it objects and advantages, refer to the following specification and to the accompanying drawings.

DETAILED DESCRIPTION OF THE PREFERRED EMBODIMENTS

Figures 1, 2:
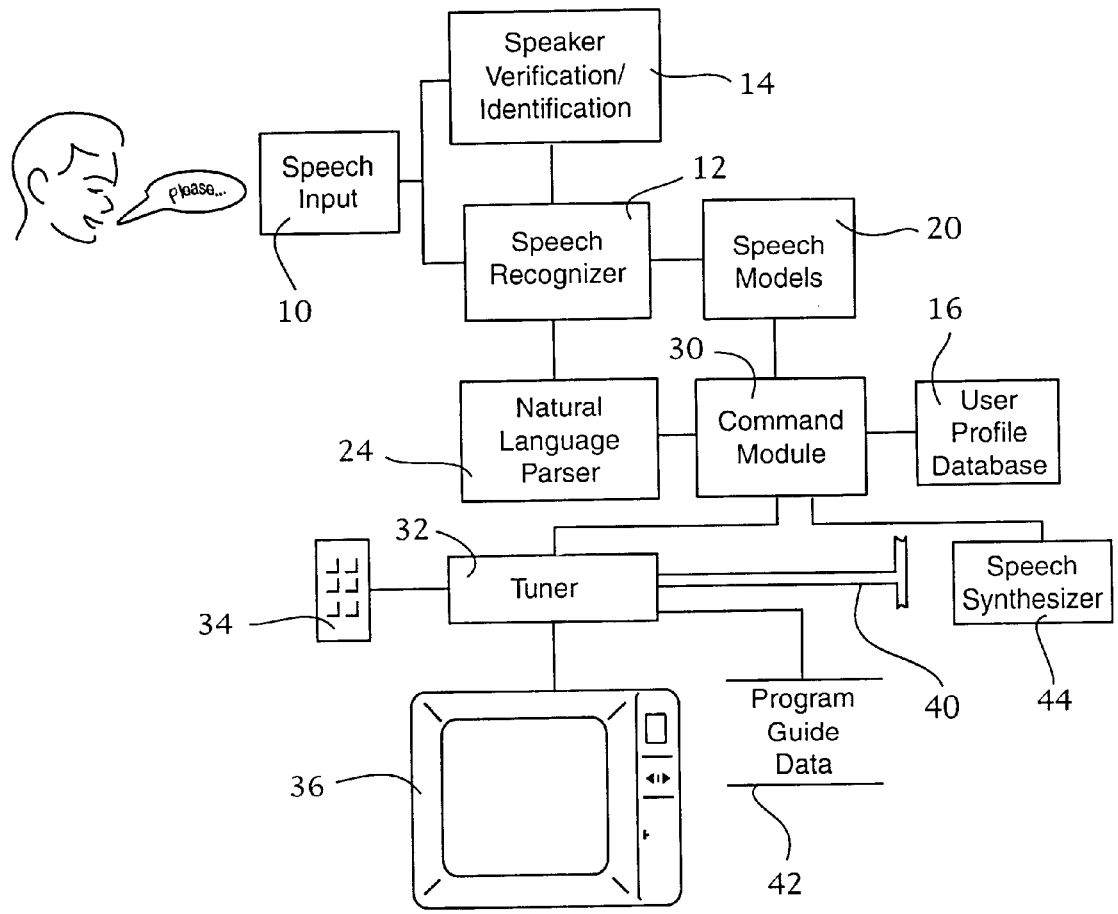
FIG. 1 is a block diagram of the preferred embodiment of the system in accordance with the invention.
FIG. 2 is a diagram of a user profile database in accordance with the invention

A preferred embodiment of the invention is illustrated in FIG. 1. The user interacts with the system by speaking, using natural language to express what the user wishes to view or how the user wishes to control the system. Speech may be input through a variety of different mechanisms, including wireless handheld microphone or hardwired microphone. The microphone can be packaged within the handheld remote control unit, if desired.

The speech input signal is processed by the speech input module 10. This module amplifies and suitably filters the signal, so that the speech recognizer can do a better job of processing the spoken content. More specifically, speech input module 10 digitizes the input speech so that features may be extracted from the speech for further processing by the speech recognizer 12.

Associated with speech recognizer 12 is a speaker verification/identification module 14. The speaker verification/identification module 14 will be discussed more fully below. Its function is to identify the identity of the speaker so that a user profile appropriate for that speaker can be loaded into the system.

In this regard, the system includes a user profile database 16 that stores user preferences and other information. A diagrammatic representation of a presently preferred user profile database is shown in FIG. 2.

Referring to FIG. 2 the preferred user profile database includes records for each user, that contain information about the user's speech patterns and viewing preferences. More specifically, the database stores adapted speech models as at 18. These are loaded into the speech model memory space 20 (FIG. 1) so that they are used by speech recognizer 12 to decode the speech for that user. The adapted speech models may be trained as the system is used by each user. A presently preferred technique for constructing the adapted speech models will be discussed more fully below.

The user profile database 16 also stores a record of which channels the user prefers to view; and alternatively, which channels are blocked so that the user will not view them. This latter feature is quite useful for parents who wish to block certain channels from their children. The system records this information as at 22 in the database, and it is thereafter used to control which channels are available to the particular user whose speech has been identified by the speaker verification module 14.

The system includes a natural language parser 24 (FIG. 1) that uses a set of pre-defined grammars to ascertain the semantics or meaning expressed by the user. The user profile database 16 includes storage of a set of customized dialog grammars as at 26. These customized grammars are used by the natural language parser along with a set of pre-defined grammars that are global to all users. Details of the presently preferred parser and its use of pre-defined and customized dialog grammars will be discussed more fully below.

Finally, the presently preferred user profile database includes a usage log as at 28 for each user. The usage log maintains a record of what programs the user has viewed in the past. The usage log can be used by the natural language parser, to more rapidly ascertain the meaning of a user's spoken command. For example, programs the user has viewed in the past may be given preference by the natural language parser when it is trying to determine what program the user is requesting. The usage log can also be used to limit the number of hours certain viewers are allowed to watch the television in any given day, a feature many parents will find helpful.

A primary function of the natural language parser and speech recognizer is to extract the semantics or meaning behind a user's natural language spoken input. The speaker verification module 14 greatly improves the ability of the natural language parser and recognizer to perform this task, by loading user profile data designed to fine-tune the semantic representation of the user's spoken input.

The natural language parser 24 supplies a semantic representation of the user's input to the command module 30. This module, in turn, commands the tuner 32 in making channel selections and in setting various tuner functions. In the latter respect, tuner 32 has an associated manual keypad entry system 34 (which may also include in infrared remote control unit, not shown). Commands from command module 30 may, for example, place certain channels in a blocked state, so that a child cannot circumvent parental control by entry of a forbidden channel through direct keypad entry.

Tuner 32 selects the active channel that will be displayed on the television screen or monitor 36. If the user speaks something like, "Please switch to Channel 7," the command module will instruct tuner 32 to make the requested channel selection directly. However, if the user enters a more complex command such as, "I want to watch a movie starring Marilyn Monroe," the natural language parser must first ascertain what programs are available that meet the request, before a channel selection is made. In this case, the command module 30 sends a command to tuner 32 to access an electronic program guide. The electronic program guide may be available on-line via the cable or satellite connection (a cable connection is illustrated in FIG. 1 at 40). If desired, the electronic program guide data can be stored in advance in a suitable program guide data store 42 that may be associated with the tuner 32, or optionally with command module 30.

The command module accesses this program guide data, or a live, on-line transmission of the data, to determine whether there is a program that meets the user's request. If the program guide includes a program that meets the user's request (in this case a movie starring Marilyn Monroe) the command module will notify the user by synthesized voiced response and/or by display of suitable text prompt on the television screen 36. If more than one selection is found, they may all be displayed or reported by spoken response.

If the requested material is not currently available, the user will be advised of this fact, and may be presented the option to record it for later viewing.

The natural language parser 24 of the preferred embodiment is designed to quickly extract the speaker's meaning from a diverse range of different spoken phrases or sentences. In other words, the user does not need to express a given request in only one way. Rather, the user simply speaks naturally, and the system extracts the user's meaning from the words spoken.

Figure 3:
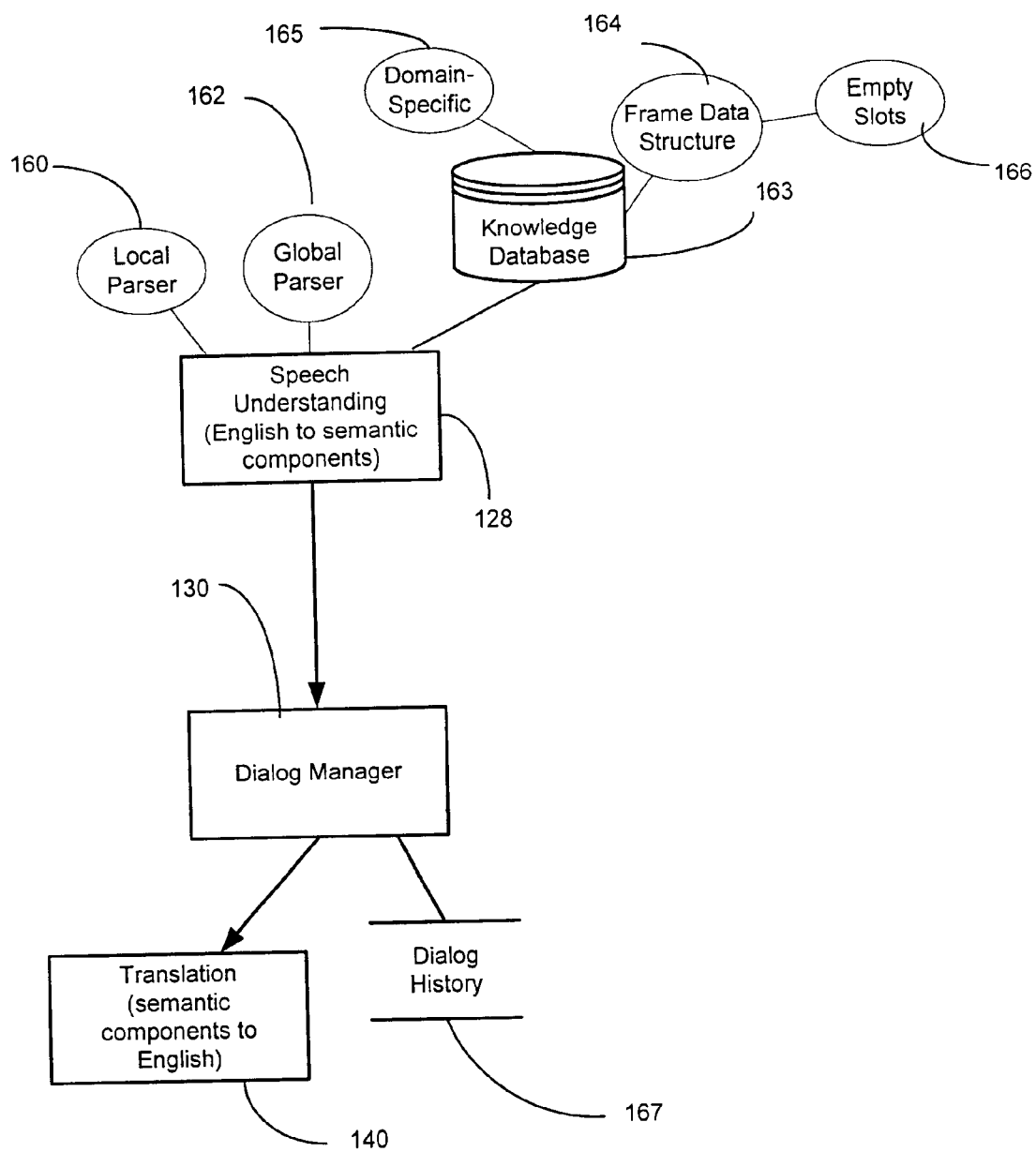
FIG. 3 is a block diagram depicting the components of the natural language parser of the presently preferred embodiment of the invention.

FIG. 3 depicts components of the natural language parser 24 in more detail. In particular, speech understanding module 128 includes a local parser 160 to identify predetermined relevant task-related fragments. Speech understanding module 128 also includes a global parser 162 to extract the overall semantics of the speaker's request.

The local parser 160 utilizes in the preferred embodiment small and multiple grammars along with several passes and a unique scoring mechanism to provide parse hypotheses. For example, the novel local parser 102 recognizes according to this approach phrases such as dates, names of people, and movie categories. If a speaker utters "record me a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to record a movie with certain constraints.

Speech understanding module 128 includes knowledge database 163 which encodes the semantics of a domain (i.e., goal to be achieved). In this sense, knowledge database 163 is preferably a domain-specific database as depicted by reference numeral 165 and is used by dialog manager 130 to determine whether a particular action related to achieving a predetermined goal is possible.

The preferred embodiment encodes the semantics via a frame data structure 164. The frame data structure 164 contains empty slots 166 which are filled when the semantic interpretation of global parser 162 matches the frame. For example, a frame data structure (whose domain is tuner commands) includes an empty slot for specifying the viewer-requested channel for a time period. If viewer 120 has provided the channel, then that empty slot is filled with that information. However, if that particular frame needs to be filled after the viewer has initially provided its request, then dialog manager 130 instructs computer response module 134 to ask viewer 120 to provide a desired channel.

The frame data structure 164 preferably includes multiple frames which each in turn have multiple slots. One frame may have slots directed to attributes of a movie, director, and type of movie. Another frame may have slots directed to attributes associated with the time in which the movie is playing, the channel, and so forth.

The following reference discusses global parsers and frames: R. Kuhn and R. D. Mori, *Spoken Dialogues with Computers* (*Chapter* 14: *Sentence Interpretation*), Academic Press, Boston (1998).

Dialog manager 130 uses dialog history data file 167 to assist in filling in empty slots before asking the speaker for the information. Dialog history data file 167 contains a log of the conversation which has occurred through the device of the present invention. For example, if a speaker utters "I'd like to watch another Marilyn Monroe movie," the dialog manager 130 examines the dialog history data file 167 to check what movies the user has already viewed or rejected in a previous dialog exchange. If the speaker had previously rejected "Some Like It Hot," then the dialog manager 130 fills the empty slot of the movie title with movies of a different title. If a sufficient number of slots have been filled, then the present invention will ask the speaker to verify and confirm the program selection. Thus, if any assumptions made by the dialog manager 130 through the use of dialog history data file 167 prove to be incorrect, then the speaker can correct the assumption.

The natural language parser 24 analyzes and extracts semantically important and meaningful topics from a loosely structured, natural language text which may have been generated as the output of an automatic speech recognition system (ASR) used by a dialogue or speech understanding system. The natural language parser 24 translates the natural language text input to a new representation by generating well-structured tags containing topic information and data, and associating each tag with the segments of the input text containing the tagged information. In addition, tags may be generated in other forms such as a separate list, or as a semantic frame.

Robustness is a feature of the natural language parser 24 as the input can contain grammatically incorrect English sentences, due to the following reasons: the input to the recognizer is casual, dialog style, natural speech can contain broken sentences, partial phrases, and the insertion, omission, or mis-recognition of errors by the speech recognizer even when the speech input is considered correct. The natural language parser 24 deals robustly with all types of input and extracts as much information as possible.

Figure 4:
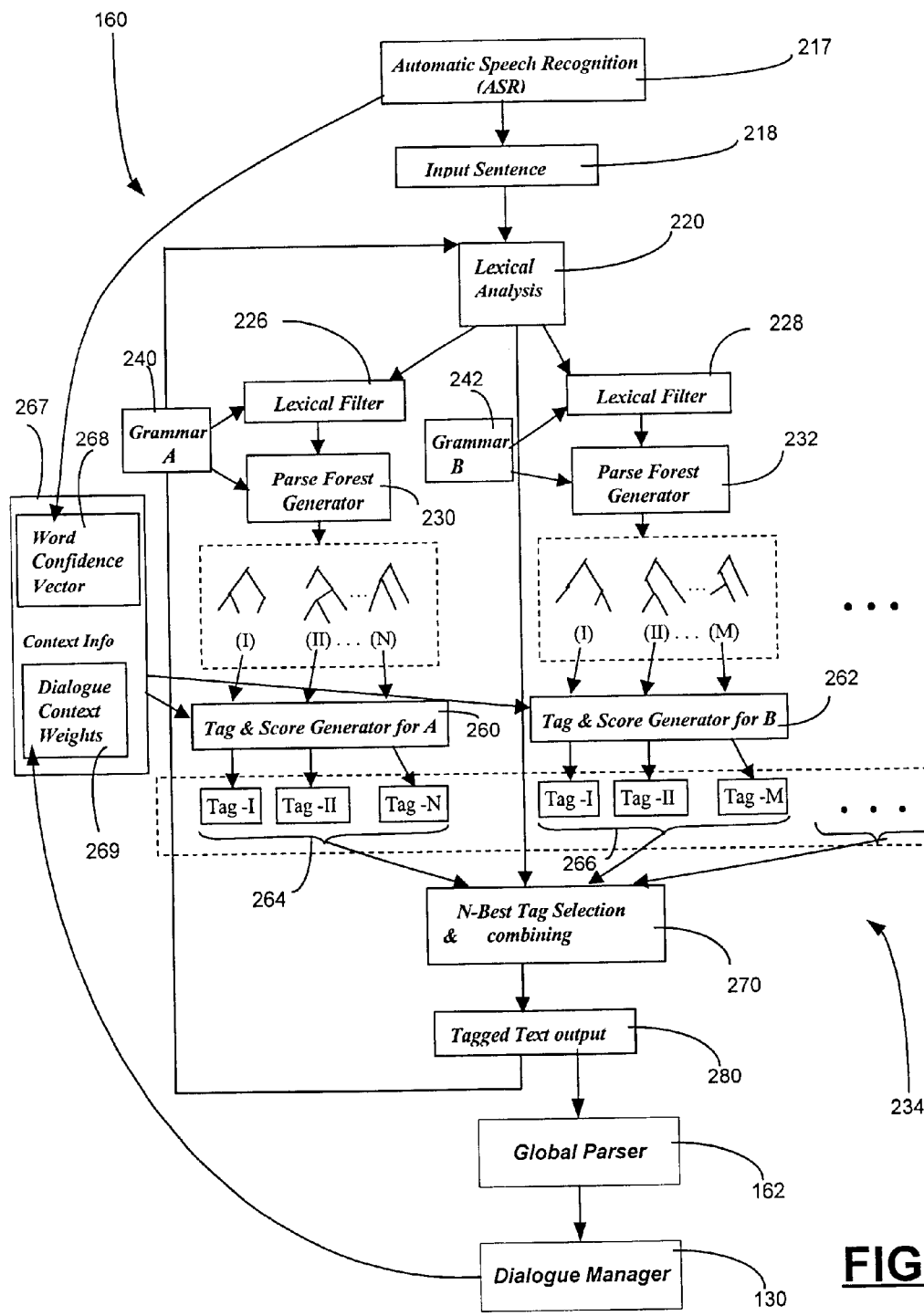
FIG. 4 is a block diagram depicting the components of the local parser of the presently preferred embodiment of the invention.

FIG. 4 depicts the different components of the local parser 160 of the natural language parser 24. The natural language parser 24 preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design*, Addison Wesley Publishing Co., Reading, Mass. (1977); and N. Tomita, *Generalized LR Parsing*, Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 160 is carried out in three stages: lexical analysis 220; parallel parse-forest generation for each topic (for example, generators 230 and 232); and analysis and synthesis of parsed components as shown generally by reference numeral 234.

Lexical Analysis

A speaker utters a phrase that is recognized by an automatic speech recognizer 217 which generates input sentence 218. Lexical analysis stage 220 identifies and generates tags for the topics (which do not require extensive grammars) in input sentence 218 using lexical filters 226 and 228. These include, for example, movie names; category of movie; producers; names of actors and actresses; and the like. A regular-expression scan of the input sentence 218 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-forest Generation

The natural language parser 24 uses a high-level general parsing strategy to describe and parse each topic separately, and generates tags and maps them to the input stream. Due to the nature of unstructured input text 218, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 240 and grammar B 242. Using the present invention's approach, topic grammars 240 and 242 are described as if they were an LR-type grammar, containing redundancies and without eliminating shift and reduce conflicts. The result of parsing an input sentence is all possible parses based on the grammar specifications.

Generators 230 and 232 generate parse forests 250 and 252 for their topics. Tag-generation is done by synthesizing actual information found in the parse tree obtained during parsing. Tag generation is accomplished via tag and score generators 260 and 262 which respectively generate tags 264 and 266. Each identified tag also carries information about what set of input words in the input sentence are covered by the tag. Subsequently the tag replaces its cover-set. In the preferred embodiment, context information 267 is utilized for tag and score generations, such as by generators 260 and 262. Context information 267 is utilized in the scoring heuristics for adjusting weights associated with a heuristic scoring factor technique that is discussed below. Context information 267 preferably includes word confidence vector 268 and dialogue context weights 269. However, it should be understood that the parser 24 is not limited to using both word confidence vector 268 and dialogue context weights 269, but also includes using one to the exclusion of the other, as well as not utilizing context information 267.

Automatic speech recognition process block 217 generates word confidence vector 268 which indicates how well the words in input sentence 218 were recognized. Dialog manager 130 generates dialogue context weights 269 by determining the state of the dialogue. For example, dialog manager 130 asks a user about a particular topic, such as, what viewing time is preferable. Due to this request, dialog manager 130 determines that the state of the dialogue is time-oriented. dialog manager 130 provides dialogue context weights 269 in order to inform the proper processes to more heavily weight the detected time-oriented words.

Synthesis of Tag-components

The topic spotting parser of the previous stage generates a significant amount of information that needs to be analyzed and combined together to form the final output of the local parser. The parser 24 is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 24 defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 270 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 280 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 162. Since each phase can only reduce the number of words in its input and the length of the input text is finite, the number of passes in the fixed-point computation is linearly bounded by the size of its input.

The following scoring factors are used to rank the alternative parse trees based on the following attributes of a parse-tree:

Number of terminal symbols.

Number of non-terminal symbols.

The depth of the parse-tree.

The size of the gaps in the terminal symbols.

ASR-Confidence measures associated with each terminal symbol.

Context-adjustable weights associated with each terminal and non-terminal symbol.

Each path preferably corresponds to a separate topic that can be developed independently, operating on a small amount of data, in a computationally inexpensive way. The architecture of the parser 24 is flexible and modular so incorporating additional paths and grammars, for new topics, or changing heuristics for particular topics is straight forward, this also allows developing reusable components that can be shared among different systems easily.

Speaker Identification/Verification

Referring to FIG. 1, the speaker identification/verification module 14 is preferably invoked when the user speaks a pre-determined wakeup command to the system. The wakeup command may be a pre-determined word used by all members of a family, such as the keyword "please" or other suitably polite keyword. Alternatively, the user can train his or her own unique keyword that may thereafter be used instead of the generic keyword for accessing the system.

The speaker identification/verification module can thus be configured to discriminate among users by simply recognizing different keywords for each user. However, the presently preferred embodiment employs a more robust system that identifies speaker characteristics unique to each speaker. In this way, different speakers can be discriminated among even if they use the same keyword.

Figure 5:
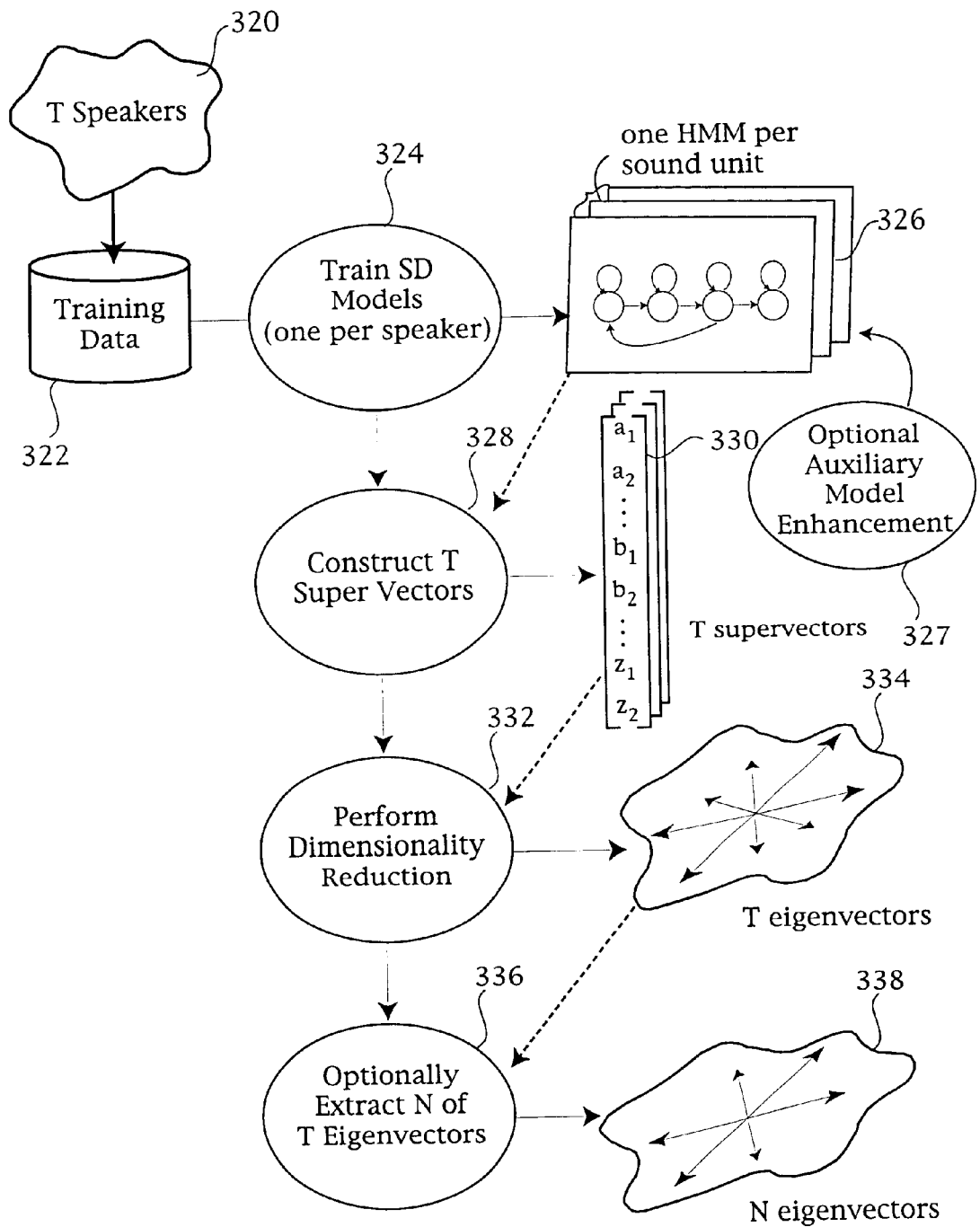
FIG. 5 is a data flow diagram illustrating how to construct an eigenspace from a plurality of training speakers.

The preferred speaker identification/verification module 14 uses speaker verification techniques based on a concept we call eigenvoices. The process for constructing an eigenspace to represent a plurality of training speakers is illustrated in FIG. 5. The illustration assumes a number T of training speakers 320 provide a corpus of training data 322 upon which the eigenspace will be constructed. Preferably, a reasonably large number of speakers (on the order of 100 to 200) provide the training data. These training data are then used to train a speaker dependent (SD) model as illustrated at 324. One model per speaker is constructed at step 324, with each model representing the entire inventory of sound units that is to be understood by the recognition system. Alternatively, the model can represent the keyword itself that will be used as the wakeup command. Each model can be a set of Hidden Markov Models (HMM) or other parameter-based speech modeling system. In the present embodiment, one HMM for each sound unit is employed. This is illustrated in FIG. 5 at 326.

Superior results are achieved where the training set represents accurate speaker-dependent models. Therefore, if desired, the speaker-dependent models may be enhanced using auxiliary adaptation techniques. Such techniques include Maximum A Posteriori estimation (MAP) and other transformation-based approaches, such as Maximum Likelihood Linear Regression (MLLR). This optional auxiliary adaptation processing is illustrated in FIG. 5 at 327 Enhancing the speaker-dependent models in this way is particularly advantageous when constructing large vocabulary applications, where the amount of training data per parameter for a given speaker may be low.

After all training data from T speakers have been used to train the respective speaker dependent models, a set of T supervectors is constructed at 328. Thus there will be one supervector 330 for each of the T speakers. The supervector for each speaker comprises an ordered list of parameters (typically floating point numbers) corresponding to at least a portion of the parameters 318 of the Hidden Markov Models for that speaker. Parameters corresponding to the sound units are included in the supervector for a given speaker. The parameters may be organized in any convenient order. The order is not critical; however, once an order is adopted it must be followed for all T speakers.

The ordered Hidden Markov Model parameters are then concatenated to form the supervector. The choice of which HMM parameters to include in the supervector may depend on the available processing power. We have found that constructing supervectors from the Gaussian means gives good results. If greater processing power is available, the supervectors may also include other HMM parameters, such as the transition probabilities or the Covariance matrix parameters . Naturally, if the Hidden Markov Models generate discrete outputs (as opposed to probability densities) then these output values may be used to comprise the supervector.

After supervectors have been constructed for each of the training speakers, dimensionality reduction is performed at step 332. Dimensionality reduction is effected by mapping of high-dimensional space onto low-dimensional space. A variety of different techniques may be used to effect dimensionality reduction. These include Principal Component Analysis (PCA), Linear Discriminant Analysis (LDA), Factor Analysis (FA), Independent Component Analysis (ICA), Singular Value Decomposition (SVD) and other transformations that apply reduction criteria based on variance.

The invention may be implemented with any such method (not only those listed) for finding such a constant linear transformation M in the special case where the input vectors are training supervectors derived from speaker-dependent modeling, and where M is used to carry out the aforementioned technique.

Dimensionality reduction upon T supervectors yields T eigenvectors, as at 334. Thus, if 320 training speakers have been used the system will generate 320 eigenvectors. These eigenvectors define what we call eigenvoice space or eigenspace.

The eigenvectors that make up the eigenvoice space contain different information; they each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on. Our experiments with this technique thus far show that the first eigenvector appears to correspond to a male-female dimension.

Although a maximum of T eigenvectors is produced at step 332, in practice, it is possible to discard several of these eigenvectors, keeping only the first N eigenvectors. Thus at step 336 we optionally extract N of the T eigenvectors to comprise a reduced parameter eigenspace at 338. The higher order eigenvectors can be discarded because they typically contain less important information with which to discriminate among speakers. Reducing the eigenvoice space to fewer than the total number of training speakers provides an inherent data compression that can be helpful when constructing practical systems with limited memory and processor resources.

After generating the eigenvectors from the training data each speaker in the training data is represented in eigenspace. The speakers may be represented in eigenspace either as points in eigenspace or as probability distributions in eigenspace.

Figure 7:
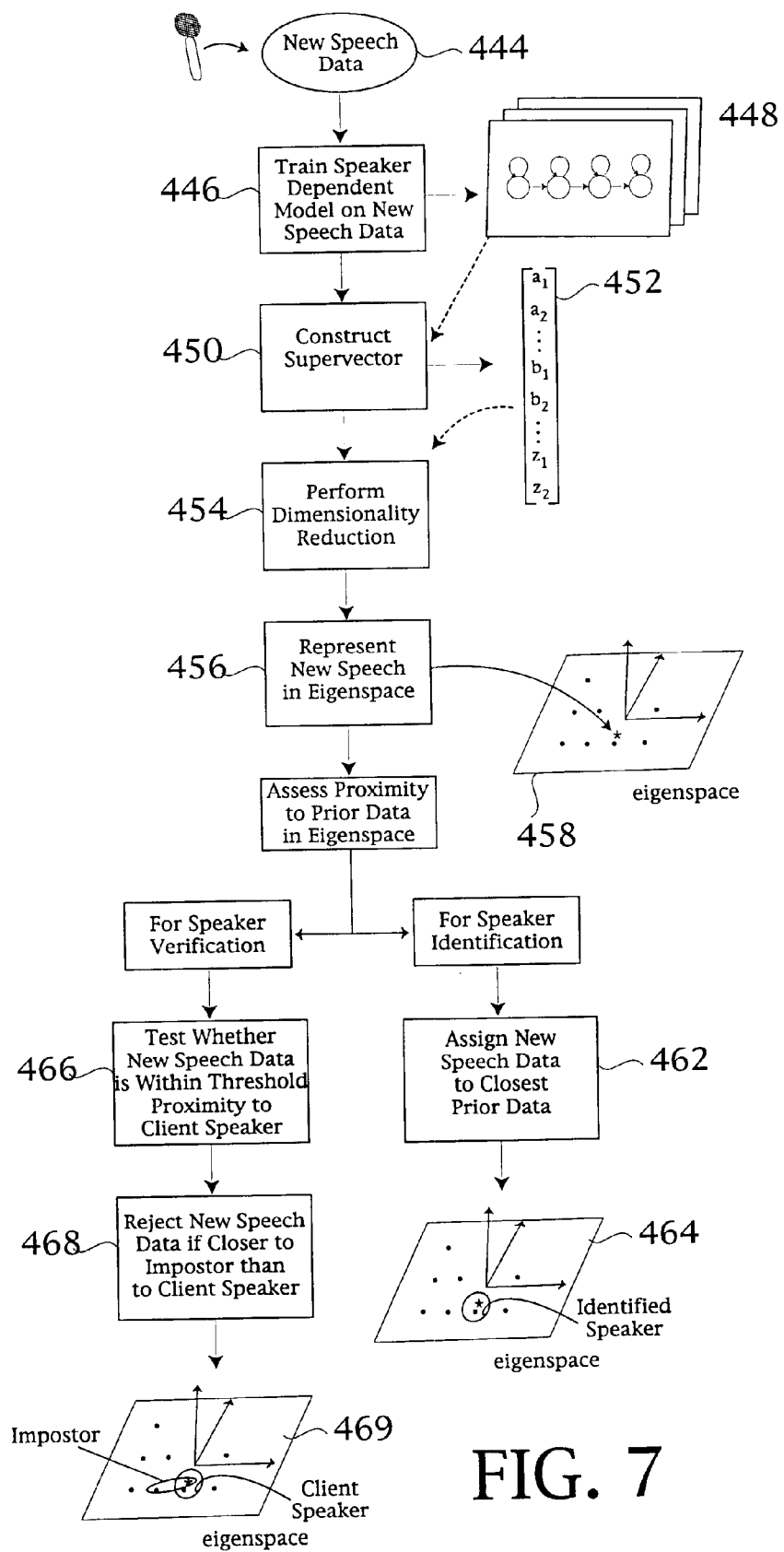
FIG. 7 illustrates the verification/identification process of the preferred embodiment.

Referring to FIG. 7, the user seeking speaker identification or verification supplies new speech data at 444 and these data are used to train a speaker dependent model as indicated at step 446. The model 448 is then used at step 450 to construct a supervector 452. Note that the new speech data may not necessarily include an example of each sound unit. For instance, the new speech utterance may be too short to contain examples of all sound units.

Dimensionality reduction is performed at step 454 upon the supervector 452, resulting in a new data point that can be represented in eigenspace as indicated at step 456 and illustrated at 458. In the illustration at 458 the previously acquired points in eigenspace (based on training speakers) are represented as dots, whereas the new speech data point is represented by a star.

Having placed the new data point in eigenspace, it may now be assessed with respect to its proximity to the other prior data points or data distributions corresponding to the training speakers. FIG. 7 illustrates an exemplary embodiment of both speaker identification and speaker verification.

For speaker identification, the new speech data is assigned to the closest training speaker in eigenspace, step 462 diagrammatically illustrated at 464. The system will thus identify the new speech as being that of the prior training speaker whose data point or data distribution lies closest to the new speech in eigenspace.

For speaker verification, the system tests the new data point at step 466 to determine whether it is within a predetermined threshold proximity to the client speaker in eigenspace. As a safeguard the system may, at step 468, reject the new speaker data if it lies closer in eigenspace to an impostor than to the client speaker. This is diagrammatically illustrated at 469, where the proximity to the client speaker and proximity to the closest impostor have been depicted.

Speaker Adaptation

The eigenvoices technology that is used by the speaker verification module 14 also provides a very fast way for adapting the speech models used by recognizer 18 to each individual user. Speaker adaptation has traditionally been a difficult problem for speech recognition systems. Often, large examples of training speech are needed before a sufficiently robust set of adapted models can be built. The eigenvoice technique greatly enhances the speaker adaptation process, because it allows adaptation to be performed even when only a brief example of adaptation speech is provided. In other words, the adaptation system of the preferred embodiment can begin to adapt the generic speaker models to a specific user as soon as the wakeup command or keyword is spoken.

Figure 6:
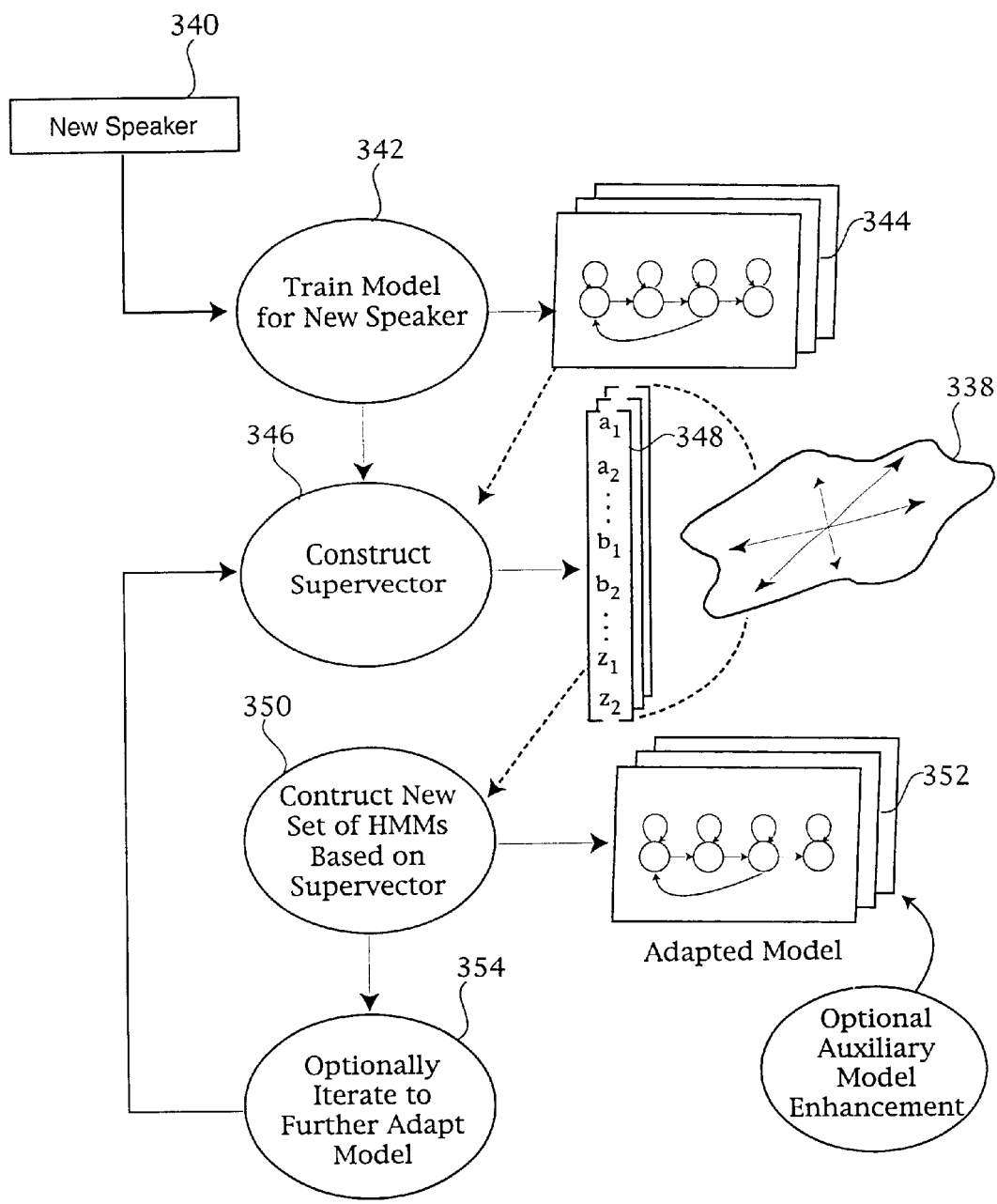
FIG. 6 is a data flow diagram illustrating how an adapted model is constructed using eigenvoices in the presently preferred embodiment of the invention.

Once the eigenvoice space has been constructed, speaker normalization, speaker adaptation or environment adaptation can be readily accomplished. While constructing the eigenspace is somewhat computationally intensive, and is typically conducted offline, adaptation is a comparatively simple computational operation that can be performed while the new speaker is using the system. Referring to FIG. 6, speech from new speaker 340 is used at step 342 to train a speaker dependent model to construct a set of HMMs 344 (one for each sound unit). The speaker dependent model can be trained in either a supervised mode, where the training system knows the content of the training speech in advance, or in an unsupervised mode, where the speech recognition system uses a speaker independent model to determine the content of the adaptation speech.

The speaker dependent model trained on this new speaker will usually be very inadequate for recognition, at least at first. However, the model may nevertheless be used to construct a supervector. The supervector is constructed at step 346 such that the supervector (supervector 348) is constrained to fall within the eigenvoice space 338 previously created from the training speakers. Supervector 348 is constructed with the imposed constraint that the HMM model used for recognition must be a linear combination of the eigenvoices comprising eigenvoice space 338.

The speaker dependent model 344 serves to estimate the linear combination of coefficients that will comprise the adapted model for that new speaker. Thus in step 350 a new set of HMMs is constructed based on supervector 348 to generate the adapted model 352. If desired, an optional iterative process may be performed at 354 to construct a new supervector from the adapted model 352 and thereafter to construct another set of HMMs from which a further adapted model may be constructed. The command module 30 is designed to receive output from the natural language parser and to provide commands to the television tuner 32 (and also to other optionally attached equipment such as recorders). Command module 30 also includes a speech synthesizer 44, which may be a concatenative speech synthesizer, for example, that injects speech prompts and information messages through command module 30 into tuner 32 where they may be played back through the audio system of the television or home entertainment system.

Essentially, command module 30 serves as the interface between the natural language parsing system of the preferred embodiment and the tuner of the television. If desired, the speech and command module components can be incorporated into the television set, itself, along with tuner 32. Alternatively, these components can be packaged as part of a set top box or other auxiliary equipment designed to connect to the television set and multimedia system.

From the foregoing it will be seen that the present invention can greatly enhance the ease of use and versatility of interactive television and multimedia systems. The invention quickly adapts to the speech of each individual user, causing those pre-stored user profile data to guide the natural language speech-enabled interaction.

While the invention has been described in its presently preferred embodiment, it will be understood that the invention is capable of modification without departing from the spirit of the invention as set forth in the appended claims.

What is claimed is:

1. A control system for audio/video equipment comprising:
   speaker verification/identification module for ascertaining the identity of a system user based on the user's speech;
   a user profile database that stores user-specific data based on the identity of a system user and retrieves said data in response to operation of said speaker verification/identification module;
   said user profile database being further configured to store at least one user preference information selected from the group consisting of preferred channels, blocked channels and combinations thereof;
   a speech recognizer and language parser system for extracting a semantic representation of spoken information provided by the user;
   a command module coupled to said speech recognizer and language parser system for providing control signals to said audio/video equipment based on said extracted semantic representation;
   said command module being further responsive to said user preference information in providing said control signals; and
   wherein at least one of said speech recognizer and language parser system and said command module uses said user-specific data.

2. The control system of claim 1 wherein said speaker verification/identification module associates a user-defined utterance with each system user and detects the occurrence of said utterance in ascertaining the identity of a system user.

3. The control system of claim 1 wherein said speaker verification/identification module associates speaker speech parameters with each system user and detects the occurrence of said speech parameters in ascertaining the identity of a system user.

4. The control system of claim 1 wherein said speaker verification/identification module associates a reduced dimensionality vector with each system user and detects the occurrence of said reduced dimensionality vector in ascertaining the identity of a system user.

5. The control system of claim 4 wherein said reduced dimensionality vector is an Eigenvector.

6. The control system of claim 1 wherein said user profile database stores user-specific data representing adapted speech models that are supplied to said speech recognizer.

7. The control system of claim 1 wherein said user profile database stores user-specific data representing customized dialog grammars that are supplied to said language parser.

8. The control system of claim 1 wherein said user profile database stores user-specific data representing preferred program channels.

9. The control system of claim 1 wherein said user profile database stores user-specific data representing blocked program channels.

10. The control system of claim 1 wherein said user profile database stores user-specific data representing usage log data for a particular user.

11. The control system of claim 1 further comprising program guide data store for storing data extracted from an electronic program guide about available program content.

12. The control system of claim 11 wherein said parser accesses said program guide data store to assist in ascertaining said semantic representation.

13. A control system for audio/video equipment comprising:
    a speaker verification/identification module for ascertaining the identity of a system user based on the user's speaking of a predefined utterance;
    a user profile database that stores user-specific data based on the identity of a system user and retrieves said data in response to operation of said speaker verification/identification module;
    said user profile database being further configured to store at least one user preference information selected from the group consisting of preferred channels, blocked channels and combinations thereof;
    a command module for providing control signals to said audio/video equipment based on interaction with said user;
    said command module being further responsive to said user preference information in providing said control signals; and
    wherein said command module uses said user-specific data.

14. The control system of claim 13 wherein said predefined utterance is a predefined wakeup command.

15. The control system of claim 13 wherein said predefined utterance is a predefined word.

16. The control system of claim 13 wherein said predefined utterance is the word: please.

17. A control system for audio/video equipment comprising:
    a speaker verification/identification module for ascertaining the identity of a system user based on the user's speech;
    a user profile data store containing user-specific data based on the identity of a system user and retrieving said data in response to operation of said speaker verification/identification module;
    said user profile database being further configured to store at least one user preference information selected from the group consisting of preferred channels, blocked channels and combinations thereof;
    a command module coupled to said speech verification module for providing control signals to said audio/video equipment based on the identity of said system user; and
    said command module being further responsive to said user preference information in providing said control signals.

18. The control system of claim 17 wherein said command module blocks predefined content from being accessed by said system user.

19. The control system of claim 17 wherein said command module admits access to predefined content by said system user.

20. The control system of claim 17 wherein said command module implements a parental control system whereby access to selected content is controlled.

21. The control system of claim 17 wherein said speaker verification/identification module associates a user-defined utterance with each system user and detects the occurrence of said utterance in ascertaining the identity of a system user.

22. The control system of claim 17 wherein said speaker verification/identification module associates speaker speech parameters with each system user and detects the occurrence of said speech parameters in ascertaining the identity of a system user.

23. The control system of claim 22 wherein said verification/identification module associates speaker speech parameters with each system user from a first utterance at enrollment time and detects the occurrence of said speech parameters from a second utterance different from said first utterance.

24. The control system of claim 17 wherein said speaker verification/identification module associates a reduced dimensionality vector with each system user and detects the occurrence of said reduced dimensionality vector in ascertaining the identity of a system user.

25. The control system of claim 24 wherein said reduced dimensionality vector is an Eigenvector.

26. The control system of claim 17 wherein said user profile database stores user-specific data representing preferred program content.

27. The control system of claim 17 wherein said user profile database stores user-specific data representing blocked program content.

28. The control system of claim 17 wherein said user profile database stores user-specific data representing usage log data for a particular user.

29. A method for controlling the operation of audio/video equipment comprising the steps of:
   processing input speech from an equipment user to ascertain the user's identity; and
   maintaining a data store of user preference information selected from the group consisting of preferred channels, blocked channels and combinations thereof;
   using said ascertained user's identity to retrieve said preference information; and
   controlling the operation of said equipment based on said preference information.

30. The method of claim 29 wherein said step of processing input speech is performed by comparing said input speech with previously stored information about the user' speech characteristics.

31. The method of claim 29 wherein said step of processing input speech is performed by comparing information extracted from said input speech with stored information about the user' speech characteristics.

32. The method of claim 29 further comprising storing profile information based on the identity of an equipment user and using said profile information in controlling the operation of said equipment.

33. The method of claim 29 further comprising providing an eigenspace corresponding to a plurality of training speakers and using said eigenspace in ascertaining said user's identity.

34. The method of claim 29 further comprising performing speech recognition upon said input speech to extract command information from said speech and using said command information to further control the operation of said equipment.

35. The method of claim 29 further comprising performing speech recognition and language parsing upon said input speech to extract semantic information from said speech and using said semantic information to further control the operation of said equipment.

36. The method of claim 29 further comprising impeding said user's control of said equipment based on said ascertained identity.

37. The method of claim 29 further comprising storing profile information based on the identity of an equipment user and impeding said user's control of said equipment based on said ascertained identity and on said stored profile information.

38. The method of claim 29 further comprising:
   storing profile information based on the identity of an equipment user, said profile information identifying at least one predetermined program selection; and
   blocking said equipment from accessing said at least one predetermined program selection based on said ascertained identity.

* * * * *